US008341061B2

(12) United States Patent
Woods et al.

(10) Patent No.: US 8,341,061 B2
(45) Date of Patent: Dec. 25, 2012

(54) SYSTEM AND METHOD FOR MANAGING INVESTMENT FUNDS

(75) Inventors: John Edward Woods, Kingswood (GB); John Michael Young, Bushey (GB)

(73) Assignee: John Woods & Associates Limited, Kingswood (GB)

( * ) Notice: Subject to any disclaimer, the term of this patent is extended or adjusted under 35 U.S.C. 154(b) by 0 days.

(21) Appl. No.: 13/101,703

(22) Filed: May 5, 2011

(65) Prior Publication Data
US 2011/0282803 A1 Nov. 17, 2011

Related U.S. Application Data

(62) Division of application No. 10/791,918, filed on Mar. 3, 2004, now Pat. No. 7,962,395.

(60) Provisional application No. 60/451,469, filed on Mar. 3, 2003.

(51) Int. Cl.
*G06Q 40/00* (2012.01)

(52) U.S. Cl. ...................................... 705/36 R; 705/35

(58) Field of Classification Search ................ 705/36 R
See application file for complete search history.

(56) References Cited

U.S. PATENT DOCUMENTS

| 6,064,986 A | 5/2000 | Edelman |
| 6,154,732 A | 11/2000 | Tarbox |
| 2002/0188536 A1 | 12/2002 | Milosavljevic et al. |

OTHER PUBLICATIONS

"Optimizing the Portfolio Selection for Mutual Funds" by Sang Lee and A.J. Lerro Dec. 1973 The Journal of Finance.*
Hiroshi Konno et al., "Bond Portfolio Optimization Problems and Their Applications to Index Tracking: A Partial Optimization Approach", 39, J. Operations Research, Society of Japan 295, n. 3 (Sep. 1966).

* cited by examiner

*Primary Examiner* — James Vezeris
(74) *Attorney, Agent, or Firm* — Venable LLP; Frank M. Gasparo

(57) ABSTRACT

Method for establishing an investment mandate and for managing institutional investment funds associated with equity-based investments, bond-based investments and other investments.

8 Claims, 12 Drawing Sheets

Capital Employed and Required Dividends - Reinvestment of Dividends basis

| Year | Required Dividends in year $m | Capital Employed at year end $m |
|---|---|---|
| Start | | 100.000 |
| Year 1 | 4.060 | 107.120 |
| Year 2 | 4.349 | 114.747 |
| Year 3 | 4.659 | 122.917 |
| Year 4 | 4.990 | 131.669 |
| Year 5 | 5.346 | 141.043 |

Capital Employed and Required Dividends - Reinvestment of Dividends basis

| Year | Required Dividends in year $m | Capital Employed at year end $m |
|---|---|---|
| Start |  | 100.000 |
| Year 1 | 4.060 | 107.120 |
| Year 2 | 4.349 | 114.747 |
| Year 3 | 4.659 | 122.917 |
| Year 4 | 4.990 | 131.669 |
| Year 5 | 5.346 | 141.043 |

Figure 3

Capital Employed and Required Dividends - Partial Income Withdrawal basis

| Year | Required Dividends in year $m | Income Remitted to Trustees $m | Income Reinvested $m | Capital Employed At Year $m |
|---|---|---|---|---|
| Start | | | | 100.000 |
| Year 1 | 4.060 | 3.045 | 1.015 | 104.030 |
| Year 2 | 4.224 | 3.168 | 1.056 | 108.222 |
| Year 3 | 4.394 | 3.296 | 1.098 | 112.584 |
| Year 4 | 4.571 | 3.428 | 1.143 | 117.121 |
| Year 5 | 4.755 | 3.566 | 1.189 | 121.841 |

Figure 4

Capital Employed and Required Interest - Reinvestment of Interest basis

| Year | Required Interest in year $m | Capital Write off $m | Capital Employed at year end $m |
|---|---|---|---|
| Start | | | 100.000 |
| Year 1 | 7.514 | 2.204 | 105.310 |
| Year 2 | 7.913 | 2.321 | 110.902 |
| Year 3 | 8.333 | 2.445 | 116.790 |
| Year 4 | 8.776 | 2.574 | 122.992 |
| Year 5 | 9.242 | 2.711 | 129.523 |

Accumulated Interest and Fair Value - Reinvestment of Interest basis
| Year | Accumulated Interest $m | Fair Value Of Stock $m | Capital Employed $m |
|---|---|---|---|
| Start | | | 100.000 |
| End Year 1 | 7.514 | 97.796 | 105.310 |
| End Year 2 | 15.428 | 95.474 | 110.902 |
| End Year 3 | 23.761 | 93.030 | 116.791 |
| End Year 4 | 32.536 | 90.455 | 122.991 |
| End Year 5 | 41.779 | 87.744 | 129.523 |
Figure 

FIGURE 7a

| | | D1 | E1 | F1 | G1 | H1 | I1 | J1 | K1 | L1 | M1 |
|---|---|---|---|---|---|---|---|---|---|---|---|
| INCOME INVESTMENT | | | | | | | | | | | |
| SAMPLE PENSION SCHEME - Equities - Reinvestment basis | | | | | | | | | | Copyright John Woods & Associates Ltd 2002 | |
| Three Years Operation Book Figures | | | | | | | | | | | |
| | | POSITION AT | INVESTMENT TRANSACTIONS | ADJUST CAP EMPLD AT END OF | POSITION AT | INVESTMENT TRANSACTIONS | ADJUST CAP EMPLD AT END OF | POSITION AT | INVESTMENT TRANSACTIONS | ADJUST CAP EMPLD AT END OF | POSITION AT |
| NARRATION | | 1.1.2003 | Y2003 | Y2003 | 31.12.2003 | Y2004 | Y2004 | 31.12.2004 | Y2005 | Y2005 | 31.12.2005 |
| | 8 | | | | | | | | | | |
| INVESTMENTS PURCHASE | 9 | | 8,800,000 | | | 5,800,000 | | | 7,200,000 | | |
| INVESTMENTS SALES | 10 | | -3,300,000 | | | -1,440,000 | | | -1,100,000 | | |
| INVESTMENTS COST OF SA | 11 | | -2,900,000 | | | -1,200,000 | | | -700,000 | | |
| INVESTMENTS - BOOK COS | 12 | 98,000,000 | 5,900,000 | | 103,900,000 | 4,600,000 | | 108,500,000 | 6,500,000 | | 115,000,000 |
| MARKT EXCESS | 13 | 0 | 11,600,000 | | 11,600,000 | 1,560,000 | | 13,190,000 | 6,690,000 | | 5,500,000 |
| MARKT VALUE | 14 | 98,000,000 | 17,500,000 | | 115,500,000 | 6,190,000 | | 121,690,000 | (190,000) | | 121,500,000 |
| OPERATING CASH | 15 | 2,000,000 | (974,990) | | 1,025,010 | 468,000 | | 1,493,010 | (574,990) | | 918,020 |
| | 16 | | | | | | | | | | |
| BROKER-CASH | 17 | | 410,148 | | 410,148 | (210,000) | | 200,148 | 365,134 | | 565,282 |
| INDEBTEDNESS | 18 | | (555,158) | | (555,158) | 700,000 | | 144,842 | (510,144) | | (365,302) |
| | 19 | | | | | | | | | | |
| CUSTODIAN-CASH | 20 | | 80,000 | | 80,000 | (48,000) | | 32,000 | 70,000 | | 102,000 |
| REFUND TAX | 21 | | 40,000 | | 40,000 | 20,000 | | 60,000 | 50,000 | | 110,000 |
| | 22 | | | | | | | | | | |
| TRUSTEES CURR A/C | 23 | | | | | | | | | | |
| | 24 | | | | | | | | | | |
| TOTAL ASSETS | 25 | 100,000,000 | 16,500,000 | 0 | 116,500,000 | 7,130,000 | 0 | 123,620,000 | (790,000) | 0 | 122,830,000 |
| | 26 | | | | | | | | | | |
| INVESTMENT INCOME | 27 | | (4,800,000) | | | (5,600,000) | | | (5,780,000) | | |
| ADMIN EXES (INVEST) | 28 | | 300,000 | | | 310,000 | | | 290,000 | | |
| NET INVESTMENT INCOME | 29 | | (4,500,000) | 3,060,000 | (440,000) | (5,290,000) | 4,646,072 | (1,580,920) | (5,500,000) | 4,656,728 | (2,222,202) |
| | 30 | | | | | | | | | | |
| MARKET CHANGE | 31 | | (11,600,000) | | | (1,560,000) | | | 6,690,000 | | |
| PROFITS/LOSSES ON SALE | 32 | | 400,000 | | | 240,000 | | | 400,000 | | |
| PROFITS/LOSSES ON EXCH | 33 | | 0 | | | 0 | | | 0 | | |
| NET MARKET MOVEMENT | 34 | | (12,000,000) | | (12,000,000) | (1,830,000) | | (13,830,000) | 6,290,000 | | (7,540,000) |
| | 35 | | | | | | | | | | |
| TARGET GROWTH | 36 | | | 3,060,000 | 3,060,000 | | 3,277,872 | 6,337,872 | | 3,511,256 | 9,849,128 |
| CAPITAL EMPLOYED | 38 | 100,000,000 | | (7,440,000) | (107,320,000) | | (7,606,940) | (114,745,940) | | (8,168,060) | (122,915,926) |
| | 39 | | | | | | | | | | |
| CHECK TOTAL = ZERO | 40 | 0 | 0 | 0 | 0 | 0 | 0 | 0 | 0 | 0 | 0 |

KEY  INPUTS
     ADDITIONS & CROSSCASTS
     CALCULATED FIGURE

FIGURE 8a

| INCOME INVESTMENT<br>SAMPLE PENSION SCHEME - Equities - Income withdrawal basis<br>Three Years Operation Book Figures | | D1<br>POSITION<br>AT<br>1.1.2002 | E1<br>INVESTMENT<br>TRANSACTIONS<br>Y2002 | F1<br>ADJUST<br>CAP. EMPLD<br>AT END OF<br>Y2002 | G1<br>FIGURE 8a<br>POSITION<br>AT<br>31.12.2002 | H1<br>INVESTMENT<br>TRANSACTIONS<br>Y2003 | I1<br>ADJUST<br>CAP. EMPLD<br>AT END OF<br>Y2003 | J1<br>POSITION<br>AT<br>31.12.2003 | K1<br>INVESTMENT<br>TRANSACTIONS<br>Y2004 | L1<br>ADJUST<br>CAP. EMPLD<br>AT END OF<br>Y2004 | M1<br>Copyright John Woods & Associates Ltd 2002<br>POSITION<br>AT<br>31.12.2004 |
|---|---|---|---|---|---|---|---|---|---|---|---|
| NARRATION | 8 | | | | | | | | | | |
| INVESTMENTS PURCHASES | 9 | | 5,540,000 | | | 1,800,000 | | | 3,344,000 | | |
| INVESTMENTS SALES | 10 | | (3,300,000) | | | (1,640,000) | | | (1,100,000) | | |
| INVESTMENTS COST OF S/ | 11 | | (2,900,000) | | | (1,200,000) | | | (700,000) | | |
| INVESTMENTS - BOOK COS | 12 | 98,000,000 | 2,640,000 | | 100,640,000 | 600,000 | | 101,240,000 | 2,644,000 | | 103,884,000 |
| MARKT EXCESS | 13 | | 11,460,000 | | 11,460,000 | 1,360,000 | | 12,820,000 | 8,264,000 | | |
| MARKT VALUE | 14 | 98,000,000 | 14,100,000 | | 112,100,000 | 1,960,000 | | | 3,620,000 | | |
| OPERATING CASH | 15 | 2,000,000 | (974,990) | | 1,025,010 | 468,000 | | 1,493,010 | (574,990) | | 918,020 |
| | 16 | | | | | | | | | | |
| BROKER-CASH | 17 | | 410,148 | | 410,148 | (210,000) | | 200,148 | 365,134 | | 565,282 |
| -INDEBTEDNESS | 18 | | (555,158) | | (555,158) | 700,000 | | 144,842 | (510,144) | | (365,302) |
| | 19 | | | | | | | | | | |
| CUSTODIAN-CASH | 20 | | 80,000 | | 80,000 | (48,000) | | 32,000 | 70,000 | | 102,000 |
| -REFUND TAX | 21 | | 40,000 | | 40,000 | 20,000 | | 60,000 | 50,000 | | 110,000 |
| | 22 | | | | | | | | | | |
| TRUSTEES CURR A/C | 23 | | 3,260,000 | | 215,000 | 4,000,000 | | 1,047,287 | 3,476,000 | | 1,227,914 |
| | 24 | | | | | | | | | | |
| TOTAL ASSETS | 25 | 100,000,000 | 16,360,000 | (3,045,000) | 113,315,000 | 6,890,000 | (3,167,714) | 117,037,287 | (744,000) | (3,295,372) | 112,997,914 |
| | 26 | | | | | | | | | | |
| INVESTMENT INCOME | 27 | | (4,800,000) | | | (5,400,000) | | | (5,400,000) | | |
| ADMIN EXES (INVEST) | 28 | | 300,000 | | (440,000) | 310,000 | | (1,306,302) | 280,000 | | (2,022,552) |
| NET INVESTMENT INCOME | 29 | | (4,500,000) | 4,060,000 | | (5,090,000) | 4,233,698 | | (5,120,000) | 4,993,996 | |
| | 30 | | | | | | | | | | |
| MARKET CHANGE | 31 | | 11,460,000 | | | (360,000) | | | 5,654,000 | | |
| PROFITS/LOSSES ON SALE | 32 | | 400,000 | | | 440,000 | | | (400,000) | | |
| PROFITS/LOSSES ON EXCH | 33 | | 0 | | | 0 | | | 0 | | |
| NET MARKET MOVEMENT | 34 | | (11,860,000) | | (11,860,000) | (1,800,000) | | (13,660,000) | 5,854,000 | | (7,796,000) |
| | 35 | | | | | | | | | | |
| TARGET GROWTH | 36 | | | 3,015,000 | 3,015,000 | | 3,136,505 | 8,151,505 | | 3,262,905 | 9,414,410 |
| CAPITAL EMPLOYED | 37 | | | (44,950,000) | (44,950,000) | | (66,122,405) | (108,222,405) | | (96,361,368) | (112,583,773) |
| | 38 | | | | | | | | | | |
| CHECK TOTAL = ZERO | 39 | 100,000,000 | 0 | 0 | 0 | 0 | 0 | 0 | 0 | 0 | 0 |
| | 40 | | | | | | | | | | |

KEY INPUTS
ADDITIONS & CROSSCASTS
CALCULATED FIGURE

| INCOME INVESTMENT | | D1 | E1 | F1 | G1 | H1 | I1 | J1 | K1 | L1 | M1 |
|---|---|---|---|---|---|---|---|---|---|---|---|
| SAMPLE PENSION SCHEME Bonds Reinvestment basis | | | | | FIGURE 9a | | | | Copyright John Woods & Associates Ltd 2002 | | |
| Three Years Operation Book Figures | | | | | | | | | | | |
| | | POSITION AT | INVESTMENT TRANSACTIONS | ADJUST CAP. EMPLD. AT END OF | POSITION AT | INVESTMENT TRANSACTIONS | ADJUST CAP. EMPLD. AT END OF | POSITION AT | INVESTMENT TRANSACTIONS | ADJUST CAP. EMPLD. AT END OF | POSITION AT |
| NARRATION | | 1.1.2002 | Y2002 | Y2002 | 31.12.2002 | Y2003 | Y2003 | 31.12.2003 | Y2004 | Y2004 | 31.12.2004 |
| INVESTMENTS PURCH. INIT. | 8 | | 100,000,000 | | | | | | | | |
| SUBSEQUENT | 9 | | 0 | | | 0 | | | 0 | | |
| INVESTMENTS SALES | 10 | | 0 | | | 0 | | | 0 | | |
| INVESTMENTS COST OF SJ | 11 | | | | | | | | | | |
| INVESTMENTS- BOOK COS | 12 | | 100,000,000 | | 100,000,000 | | | 100,000,000 | | | 100,000,000 |
| MARKT EXCESS | 13 | 0 | (2,204,255) | 0 | (2,204,255) | (2,321,301) | 0 | (4,525,556) | (2,444,552) | 0 | (6,970,108) |
| MARKT VALUE | 14 | | 97,795,745 | | 97,795,745 | | | 95,474,444 | (2,444,552) | | 93,029,892 |
| OPERATING CASH | 15 | 100,000,000 | (100,000,000) | | 0 | 0 | | 0 | 0 | | 0 |
| | 16 | | | | | | | | | | |
| BROKER-CASH | 17 | | 0 | | 0 | 0 | | 0 | 0 | | 0 |
| -INDEBTEDNESS | 18 | | 0 | | 0 | 0 | | 0 | 0 | | 0 |
| | 19 | | | | | | | | | | |
| CUSTODIAN-CASH | 20 | | 7,514,255 | | 7,514,255 | 7,913,262 | | 15,427,517 | 8,333,456 | | 23,760,973 |
| -REFUND TAX | 21 | | 0 | | 0 | 0 | | 0 | 0 | | 0 |
| TRUSTEES CURR A/C | 22 | | | | | | | | | | |
| | 23 | | | | | | | | | | |
| TOTAL ASSETS | 24 | 100,000,000 | 5,310,000 | | 105,310,000 | 5,591,961 | 0 | 110,901,961 | 5,888,904 | 0 | 116,790,865 |
| | 25 | | | | | | | | | | |
| INVESTMENT INCOME | 26 | | (7,514,255) | | | (7,913,262) | | | (8,333,456) | | |
| ADMIN EXES (INVEST) | 27 | | 0 | | | 0 | | | 0 | | |
| NET INVESTMENT INCOME | 28 | | (7,514,255) | 7,514,255 | 0 | (7,913,262) | 7,913,262 | 0 | (8,333,456) | 8,333,456 | 0 |
| | 29 | | | | | | | | | | |
| MARKET CHANGE | 30 | | 2,204,255 | | | 2,321,301 | | | 2,444,552 | | |
| PROFITS/LOSSES ON SALE | 31 | | 0 | | | 0 | | | 0 | | |
| PROFITS/LOSSES ON EXCH | 32 | | 0 | | | 0 | | | 0 | | |
| NET MARKET MOVEMENT | 33 | | 2,204,255 | (2,204,255) | 0 | 2,321,301 | (2,321,301) | 0 | 2,444,552 | (2,444,552) | 0 |
| | 34 | | | | | | | | | | |
| | 35 | | | | | | | | | | |
| | 36 | | | | | | | | | | |
| CAPITAL EMPLOYED | 37 | (100,000,000) | | (5,310,000) | (105,310,000) | | (5,591,961) | (110,901,961) | | (5,888,904) | (116,790,865) |
| | 38 | | | | | | | | | | |
| CHECK TOTAL = ZERO | 39 | 0 | 0 | 0 | 0 | 0 | 0 | 0 | 0 | 0 | 0 |

KEY    INPUTS
ADDITIONS & CROSSCASTS
CALCULATED FIGURE

Parameters
| | | | Workings | | | | |
|---|---|---|---|---|---|---|---|
| | | | Coupon 1 | 3,806,350 | | | |
| | | | Coupon 2 | 3,707,905 | | | |
| | | | Total One Year | 7,514,255 | Fair Value→ | | Fair Value→ | Fair Value→ |
| | | | Accum. Target Inc | 7,514,255 | 97,795,745 | Accum. Target Inc | 15,427,517 | 95,474,444 | Accum. Target Inc | 23,760,973 | 93,029,892 |
| Running Yield basis | 46 | 7.4158 | | | | | |
| Redemption Yield ba | 47 | 5.31 | | | | | |
| Re-Investment Yield | 48 | 5.31 | | | | | |

FIGURE 9b

SYSTEM AND METHOD FOR MANAGING INVESTMENT FUNDS

CROSS-REFERENCE TO RELATED PATENT APPLICATIONS

This application is a divisional of U.S. application Ser. No. 10/791,918, filed Mar. 3, 2004 now U.S. Pat. No. 7,962,395, which claims the benefit of U.S. Provisional Patent Application No. 60/451,469, filed on Mar. 3, 2003. Both U.S. application Ser. No. 10/791,918 and U.S. Provisional Patent Application No. 60/451,469 are incorporated herein by reference in their entirety.

FIELD

The present application relates to investment management and, more particularly, to a system and method for setting investment mandates and for managing investment funds, including monitoring an investor manager's performance.

BACKGROUND

Most investment institutions have boards of trustees or the like. The trustees are entrusted with investment funds and have a fiduciary duty to the beneficiaries of the funds. The trustees almost always delegate the day-to-day management of the investment funds to a third party investment manager because the trustees are often not sufficiently skilled in such management. The trustees normally require the investment manager to enter into a mandate associated with an investment management agreement. The mandate describes the objectives set for the investment manager and recites the investment manager's powers and duties. The mandate greatly influences the manner in which the investment manager operates because the mandate usually prescribes in detail the target(s) that the investment manager is expected to achieve, the constraints under which he must operate and any applicable performance measurement methods.

Before the identification and commissioning of an investment manager, the trustees usually decide in which asset classes to invest the funds and in what proportions. In the conventional framework, asset allocation decisions are regarded as of over-riding importance and are commonly addressed by means of mathematical or, statistical simulations, for example, using asset-liability studies. Asset allocation decisions and strategies are complicated and quite technical and, thus, many trustees appoint an investment adviser to handle such decisions and strategies. The investment advisor may also be responsible for selecting investment manager (s) and in drafting the mandate(s) for the trustees. Given the imbalance of expertise between the trustees and the investment adviser, it is not surprising that, in practice, the investment advisor makes most of the critical decisions in the name of the trustees.

There is little competition amongst investment advisors because if trustees replace one advisory firm for another advisory firm, it is highly unlikely that the replacement advisory firm will give any significantly different advice. Such consensual behavior by the advisor community has natural business advantages to the community as a group. The business advantages include enabling the advisor community to dominate the institutional investment process despite the fact that that as individuals they rarely have experience in actually managing investments.

The conventional arrangements for the investment of funds rely heavily on the notion that stock markets are "efficient", that is, stock market prices are set in a manner that prevents any systematic achievement of an above average rate of return, net of the costs involved, except by accepting a higher level of risk or degree of volatility of the outcome. By contrast, the exemplary embodiments described in the present application are predicated on the belief that stock markets are not efficient. In particular, there are opportunities for arbitrage, that is, entering into a transaction that can later be reversed at a profit, provided an adequate time period is available to the investment manager. In the conventional arrangements, such opportunities are prevented by the short-term nature of the investment performance measurement system. Indeed, this short-term approach is a contributory cause of the anomalies which give rise to the favorable arbitrage opportunities described above.

Investment performance is traditionally measured by income received and change in market value during a measurement period. In practice, such measurements are made very frequently, for instance, on a monthly basis, or on a quarterly basis at the longest. The investment manager focuses on the market value of the portfolio—the collective term for the investment holdings selected—and how the market is expected to move over the short-term. If the investment manager takes a longer-term view, the investment manager incurs a serious business risk due to the volatility of the market. Hence, in practice, the investment manager devotes a large part of its efforts to trying to second guess the market, leading to excessive buying and selling of holdings so as to gain an advantage, albeit a small one, over whatever index portfolio represents the investment performance target set in the mandate.

Therefore, in a conventional mandate, an investment manager is typically instructed to outperform a market index, for example, to outperform the S&P 500 by 1% p.a. over rolling three year periods subject to quarterly monitoring, maximum permitted underperformance over a given period say, four quarters, tracking error or active risk of a particular percentage such as 3%, and specified active money statistics at the sector and individual stock levels. The effect of such a mandate is to induce investment managers to be closest-indexers, that is, to base their investment decisions on the index weights of individual securities rather than their intrinsic merits. Hence, investment managers are forced under a conventional mandate to try to anticipate changes in market sentiment, that is, to try to guess which stocks will benefit from short-term changes in market value through movements in market sentiment (referred to herein in as the "revaluation effect").

Accordingly, a need exists for a new approach to setting investment mandates and inducing change in investment manager behavior with a de-emphasis on market performance. There is also a need, however, for achieving goals associated with market performance without expressly seeking to outperform the market. The exemplary embodiments of the present application described herein are based on the principle that an investment manager is given control over a series of cash flows and exercises his discretion to improve the terms on which he purchases future cash flows. Therefore, the investment manager takes advantage of the re-rating of securities by the market.

SUMMARY OF THE INVENTION

An aspect of the present application provides for a method for managing investment funds, the method comprising determining a predefined term for investing a predetermined amount of institutional capital in equity-based investments, determining a plurality of dividend targets, the plurality of dividend targets associated with a plurality of respective periods during the predefined term, determining a value indicator to be used during the predefined term, and selecting an investment manager for investing the capital in the equity-based investments for the predefined term and for at least meeting the plurality of dividend targets, the investment manager using at least the value indicator to determine whether to buy, to hold or to sell at least one of the equity-based investments during the predefined term.

Another aspect of the present application provides for a method for managing investment funds, the method comprising determining a predefined term for investing a predetermined amount of institutional capital in equity-based investments, determining an initial dividend yield, determining a growth rate, determining a value indicator to be used during the predefined term, and selecting an investment manager for investing the capital in the equity-based investments for the predefined term in accordance with the initial dividend yield and the growth rate, the investment manager using at least the value indicator to determine whether to buy, to hold or to sell at least one of the equity-based investments during the predefined term.

A further aspect of the present application provides for a method for establishing an institutional investment mandate between a trustee and an investment manager to manage an institutional investment fund, the method comprising determining a plurality of fund requirements associated with equity-based investments excluding capital gains and including an initial investment amount, a predefined term for the mandate, an initial dividend yield, a growth rate, a fundamental return and a value indicator, and generating the institutional investment mandate based on the plurality of fund requirements, the investment manager operating according to the plurality of fund requirements in the institutional investment mandate during the predefined term.

A still further aspect of the present application provides for a method for managing institutional investment according to dividend growth on a dividend reinvestment basis during a mandate term, the method comprising (a) determining an average initial dividend yield, (b) determining a fundamental rate of return, (c) allocating an initial amount of institutional capital to be invested during the mandate term in equity-based investments, (d) establishing a first dividend goal for a first period of the mandate term, the first dividend goal equal to the average initial dividend yield of a plurality of equities, (e) generating a second amount of capital for a second period of the mandate term by increasing the initial amount of capital during the first period by the fundamental rate of return, (f) generating a second dividend goal for a second period of the mandate term, the second dividend goal determined by multiplying the initial amount of capital by the average initial dividend yield, and (g) repeating (e) and (f) for any subsequent periods of the mandate term based on the amount of capital and the dividend goal of the respective preceding period.

An additional aspect of the present application provides for a method for managing institutional investment according to dividend growth on an at least partial dividend withdrawal basis during a mandate term, the method comprising (a) determining an income withdrawal percentage for at least one period during the mandate term, (b) determining an average initial dividend yield, (c) determining a fundamental rate of return, (d) allocating an initial amount of institutional capital to be invested during the mandate term in equity-based investments, (e) determining a first dividend goal for a first period of the mandate term, the first dividend goal equal to the average initial dividend yield of a plurality of equities, (f) determining a first withdrawal amount from the first dividend goal, the first withdrawal amount associated with the first period, (g) determining an amount of capital for the first period of the mandate term by increasing the initial amount of capital during the first period by a predefined factor, (h) determining a second dividend goal for a second period of the mandate term, the second dividend goal determined by multiplying the amount of capital for the first period by the average initial dividend yield, (i) determining a second withdrawal amount from the second dividend goal, the second withdrawal amount associated with the second period, and (j) determining an amount of capital for the second period of the mandate term by increasing the amount of capital for the first period by a predefined factor.

An aspect of the present application provides for a method for managing investment funds, the method comprising determining a predefined term for investing a predetermined amount of institutional capital in at least one bond investment, defining a value indicator to be used during the predefined term, selecting an investment manager for investing the predetermined amount of institutional capital in the at least one bond investment for the predefined term, the investment manager using the value indicator to determine whether to buy, to hold, or to sell the at least one bond investment during the predefined term, and monitoring performance of the investment manager according to whether the selected investment manager meets one or more performance targets not based on market value.

Another aspect of the present application provides for a method for establishing an institutional investment mandate between a trustee and an investment manager to manage an institutional investment fund, the method comprising determining a plurality of fund requirements associated with at least one bond investment including an initial amount of institutional capital, a predefined term for the mandate, a fundamental rate of return and a value indicator, and generating the institutional investment mandate based on the plurality of fund requirements, the investment manager operating according to the plurality of fund requirements in the institutional investment mandate during the predefined term, wherein interest is earned on the at least one bond investment during each of a plurality of periods during the predefined term.

A further aspect of the present application provides for a method for establishing an investment mandate between a principal and an agent, the agent investing capital in at least one asset according to the investment mandate, the method comprising determining at least one performance target to be included in the investment mandate, the at least one performance target defined by at least one fundamental attribute of an asset, the at least one fundamental attribute including a value indicator, and informing the agent of the at least one performance target, wherein the value indicator is used by the agent for determining whether to buy, to hold or to sell the at least one asset.

A still further aspect of the present application provides for a method of portfolio management employed by an agent, the agent and a principal being parties to an investment mandate, the method comprising achieving a fundamental rate of return, FRR(t), on capital employed, CE(t), at the beginning of a respective year, t, of a predetermined period, instead of achieving one of a rate of return relative to an individual market-related index, a peer group index and a composite of the individual market related index and the peer group index, the capital being invested in at least one asset and the fundamental rate of return being achieved by one of achieving a flow of investment income, I(t), defined by $I(t)=Y(t)*CE(t)$ for the respective year, t, of a predetermined period, wherein Y(t) represents a yield during the respective year, t, of the predetermined period, and achieving a rate of growth of a value indicator without decreasing a ratio of an amount of the value indicator to a market value of the at least one asset when Y(t)=0 for each respective year, t, during the predetermined period, the value indicator being used by the agent for determining whether to buy or to sell the at least one asset, wherein if the at least one asset is at least one equity, the at least one equity is not expected to produce dividend income, and if the at least one asset is at least one bond, the at least one bond is associated with zero-coupon securities.

An additional aspect a method for monitoring performance of an agent, the agent and a principal being parties to an investment mandate, the method comprising receiving information from the agent indicating results achieved from investing capital, CE(t), of the principal in at least one asset during at least one respective year, t, of a predetermined period, and comparing the information to a target included in the investment mandate, the target defined by at least one fundamental attribute of an asset, the at least one fundamental attribute including the value indicator, wherein the value indicator is used by the agent for determining whether to buy or to sell the at least one asset.

An aspect of the present application provides for a method for establishing an investment mandate between a principal and an agent, the method comprising receiving a plurality of bids from a plurality of respective candidates, each of the plurality of candidates submitting a respective bid including an assessment of prospective asset market returns in terms of a yield and a growth rate of a respective value indicator over a predetermined period, selecting one of the plurality of candidates as the agent at least based on the assessment of the prospective market returns in the respective bid, and generating at lest one parameter for the investment mandate according to the yield and the growth rate, the at least one parameter including a target, the target defined by at least one fundamental attribute of an asset, the at least one fundamental attribute including the value indicator, wherein the value indicator is used by the agent for determining whether to buy, to hold or to sell at least one asset.

A further aspect of the present application for a method for selecting an agent to be associated with an investment mandate, the method comprising receiving a plurality of bids from a plurality of respective candidates, each of the plurality of candidates submitting a respective bid including an assessment of prospective asset market returns in terms of a yield and a growth rate of a respective value indicator over a predetermined period, comparing each of the plurality of bids to a target of a principal associated with the investment mandate, the target being defined by at least one fundamental attribute of an asset, the at least one fundamental attribute including the value indicator, wherein the value indicator is used by the agent for determining whether to buy, to hold or to sell at least one asset, and selecting one of the plurality of candidates as the agent at least based on the comparison of the respective bid to the target.

A still further aspect of the present application provides for a method for determining asset allocations associated with an investment mandate between a principal and an agent, the method comprising initially selecting at least one asset for allocating capital according to a target set by the principal during a predetermined period, the target defined by at least one fundamental attribute of an asset, the at least one fundamental attribute including a value indicator, wherein the value indicator is used by the agent for determining whether to buy or to sell the at least one asset, and reallocating at least a portion of the capital in at least one other asset due to changes in at least one asset market condition, the portion of the capital reallocated according to the target during the remaining time of the predetermined period.

BRIEF DESCRIPTION OF THE DRAWINGS

FIG. 3 illustrates an exemplary table of capital employed and required dividends on a reinvestment basis;

FIG. 4 illustrates an exemplary table of capital employed and required dividends on a partial income withdrawal basis;

FIG. 6 illustrates an exemplary table of accumulated interest and fair value on a reinvestment of interest basis for bond investment.

FIGS. 7a and 7b illustrate an exemplary spreadsheet of the salient figures that arise when operating an income investment mandate on the basis that an investment manager reinvests the income;

FIGS. 8a and 8b illustrate an exemplary spreadsheet of the salient figures that arise when operating an income investment mandate on the basis that an investment manager does not reinvest all the income; and FIGS. 9a through 9b illustrate an exemplary spreadsheet of the salient figures that arise when operating an income investment mandate on the basis that an investment manager invests solely in bonds and reinvests the income.

DETAILED DESCRIPTION

The exemplary embodiments of the present application are described herein based on equity investments with reference to FIGS. 1 through 4 and FIGS. 7a through 8b and bond investments with reference to FIGS. 1, 2, 5, 6, 9a and 9b. The present application, however, is not limited to such investments or a combination thereof. Rather, the exemplary embodiments are equally applicable to any investment that produces income. Indeed, the underlying principles can be readily extended to such cases as zero-coupon bonds and equities which do not pay dividends, and real property investments, as would be appreciated by a person having ordinary skill in the art. The respective mandate would be appropriately constructed and the performance of the investment manager would be monitored by the respective trustees in a similar manner as described below for investments in equities and/or bonds, for example, by determining whether the investment manager meets one or more income goals.

As described in the present application, the exemplary investment mandate as it relates to equities encourages investment managers to take a long-term view and invest in solid companies in terms of prospective earnings and dividends, companies perhaps which are currently out of favor with the market. When the true worth of such companies is recognized, an investment manager and the respective client will necessarily gain because there will be a significant re-rating by the market. These investment managers do not focus on short-term movements in market value.

Further, by structuring the exemplary mandate as described herein, the investment manager has control over a future stream of dividends and is required to exercise discretion to improve the terms on which the investment manager purchases future income. Accordingly, it can be expected that, when trading, the investment manager will achieve a capital gain through the revaluation effect. The revaluation effect is put in its proper place as something which benefits clients when the respective investment manager makes sensible long-term investment decisions. Only by ignoring the revaluation effect as an explicit target are investment managers able to take advantage of it, as described herein. The revaluation effect, and more generally the market, are at the service of the client in the exemplary mandate of the present application, rather than vice versa as necessarily happens with the conventional mandate.

Figure 1:
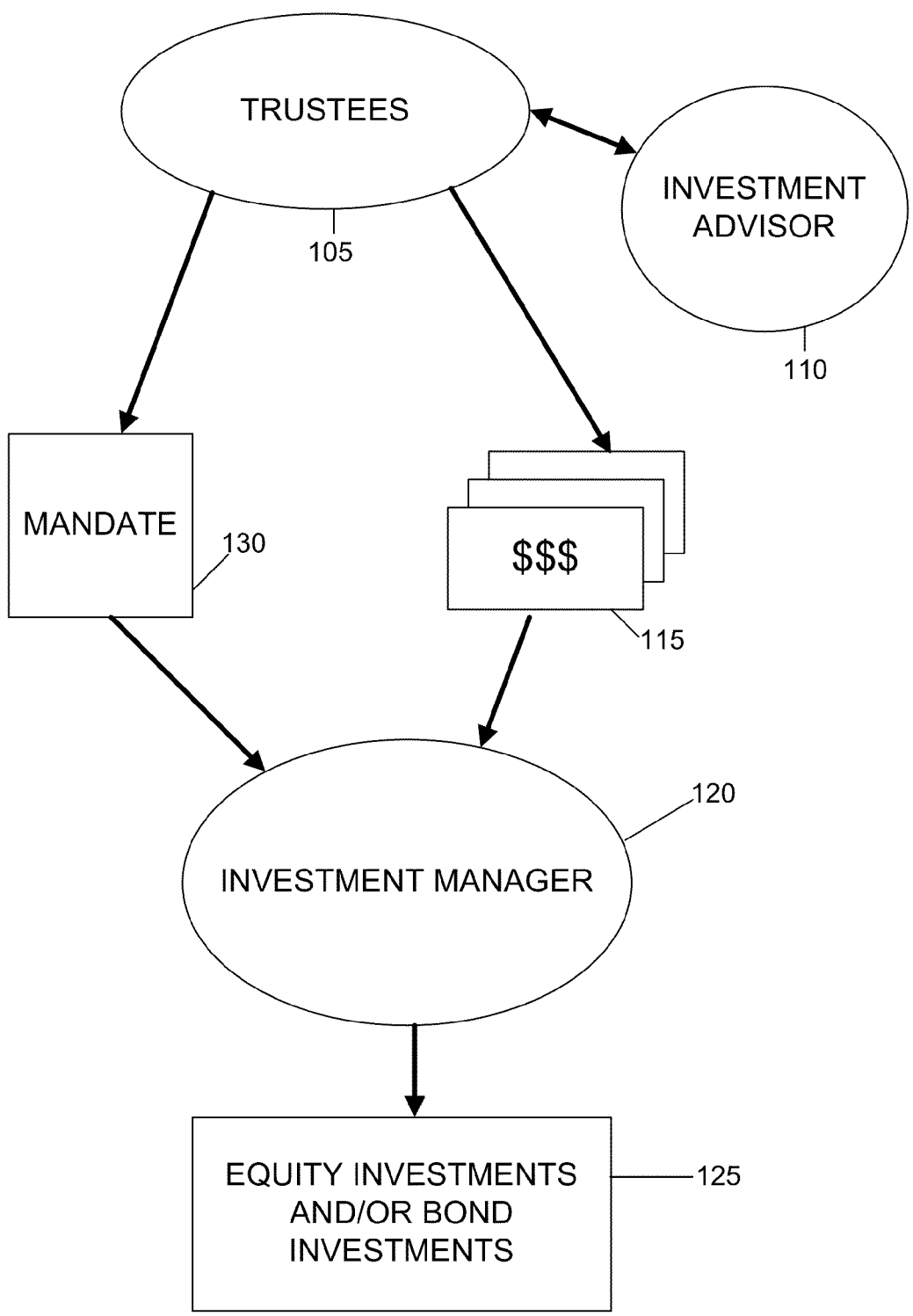
FIG. 1 illustrates a block diagram depicting the association between trustees, an investment manager and an 10 investment advisor.

FIG. 1 illustrates a block diagram depicting the association between trustees, an investment manager and an investment advisor. As can be seen in FIG. 1, trustees 105 can seek advice from investment advisor 110, such advice being sought before, during and after a business relationship is established between trustees 105 and investment manager 120. Alternatively, trustees 105 do not consult with investment advisor 110, for instance, because of their familiarity with the exemplary embodiments described herein, arising out of their previous practice in establishing such arrangements. Investment manager 120, also known as a portfolio manager or a fund manager, receives from trustees 105 mandate 130 including predefined goals, for instance, initial yield and dividend growth target, as described below in more detail, and capital 115. After selecting equity investments 125, investment manager 120 invests capital 115 in equity investments 125 (hereinafter referred to as the "fund") in order to achieve the initial yield and the dividend growth target set by trustees 105 with or without the advise of investment advisor 110.

Figure 2:
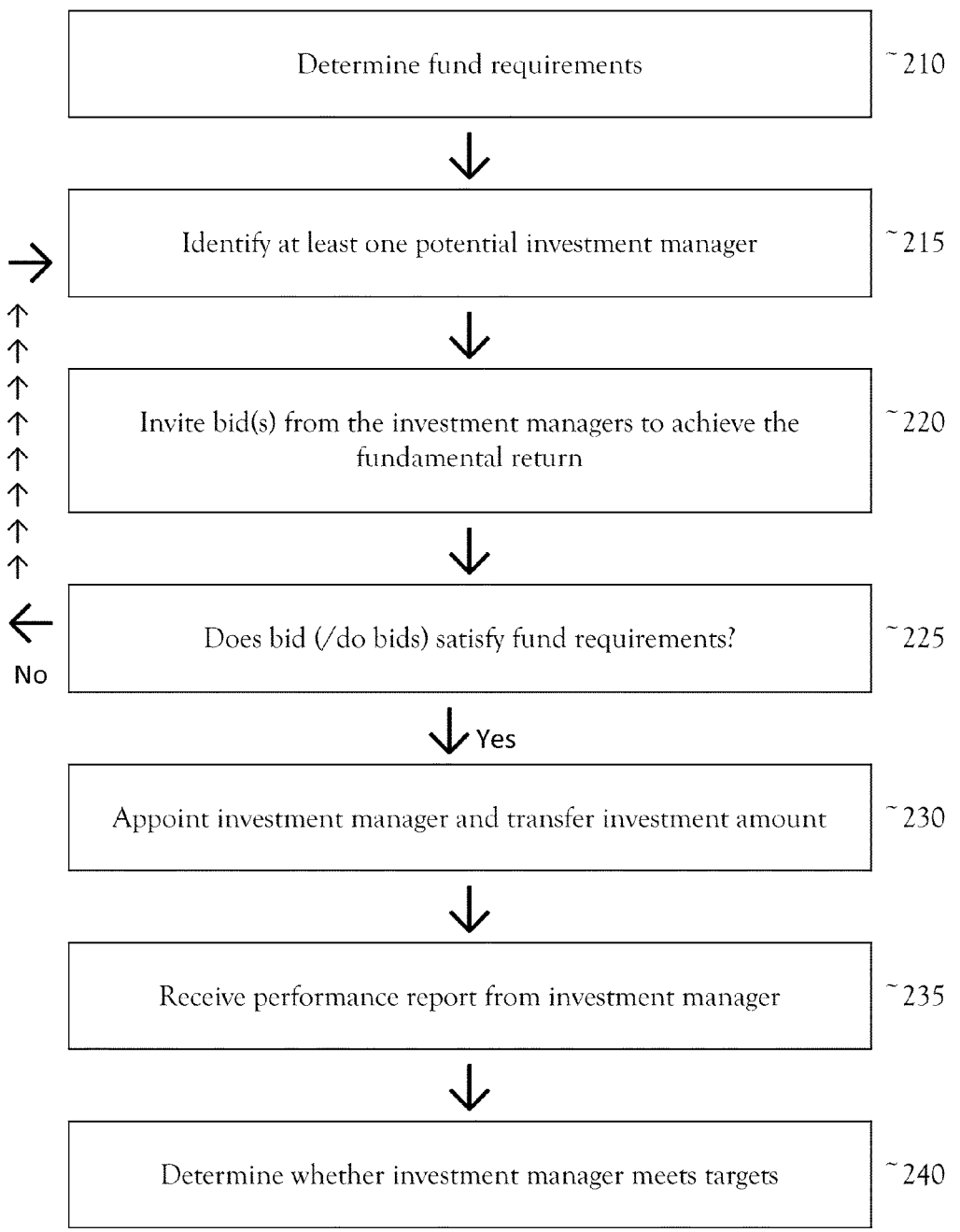
FIG. 2 illustrates an exemplary flow diagram for establishing an exemplary mandate and for managing investments of the present application.

FIG. 2 illustrates an exemplary flow diagram for establishing an exemplary mandate and for managing investments according to the present application. Initially, trustees 105 determine fund requirements that will ultimately be included in exemplary mandate 130. Mandate 130 is entered into between trustees 105 and an investment manager who is selected as set forth below, describing the objectives set for the investment manager and recites the investment manager's powers and duties. For example, mandate 130 will include fund requirements such as an investment amount, for instance, capital 115, a predefined term, an initial dividend yield, a dividend growth rate, a fundamental return determined by the initial dividend yield and the dividend growth rate, and a value indicator, in 210. Investment manager 120 will invest capital 115 during the predefined term in accordance with mandate 130 in an attempt to meet or exceed the enumerated goals. The exemplary embodiments are described herein with the initial capital 115, also referred to as the initial capital employed, equal to $100 million and the predefined term equal to five years. The present application is not meant, however, to be limited to this amount and period, as other fixed periods and investment amounts are equally applicable.

In 210, trustees 105 decide the fundamental return to be included in mandate 130 keeping in mind a required rate of return. As can be appreciated by a person having ordinary skill in the art, the required rate of return is the minimum rate of return trustees 105 believe will enable the fund to achieve its objectives, for instance, after taking the advice of an actuary or other advisor.

In an exemplary embodiment, the fundamental return takes into account an initial yield and a growth rate, for instance, an initial dividend yield and a dividend growth rate, respectively. Specifically, the fundamental return ("FR") is determined as follows and is expressed as a percentage per annum:

$$(1+FR)=(1+\text{initial dividend yield})*(1+\text{dividend growth rate}) \quad (1)$$

The initial dividend yield is selected, for example, by choosing an initial portfolio of equities and averaging the dividend yields of each of the equities. As will be appreciated by a person having ordinary skill in the art, dividend yield is calculated by dividing the annual dividend by the equity's market value. Hence, the initial dividend yield is the annual dividend divided by the equity's purchase price. During the term of mandate 130, the dividend yield on the equities of the portfolio will vary from the initial level, but the fundamental return will remain the same because the initial dividend yield and the required dividend growth are not changed during the term. Further, the dividend growth rate is the required rate at which dividends will grow, for example, on an annual basis, and is determined by applying the initial dividend yield to capital employed which is increased each year at the rate of the fundamental return.

Even though the exemplary embodiments are described herein with the value indicator being the dividend, alternatively the value indicator can be an earnings or other statistic, such as cash flow or book value. The value indicator is used by investment manager 120 to decide whether to purchase or sell a stock. In the present application, while the value indicator is the yardstick for measuring reevaluation effects, i.e., the change in value of an equity or portfolio that is attributable to market sentiment as opposed to any change in fundamentals, generating capital gains is omitted from the aims of mandate 130 which is in sharp contrast to conventional mandates. Further, while the change in value due to market sentiment is measured as described herein, any interim monitoring of market values during the term of mandate 130 is for secondary reasons, such as for compliance reasons.

After the fundamental return and any other fund requirements are determined by trustees 105, trustees 105 identify at least one potential investment manager, in 215.

In an exemplary embodiment, in the event that a plurality of investment managers are identified, the identified investment managers are invited to bid to manage the fund with an objective of achieving the predefined fundamental return set by trustees 105, in 220. In 225, the received bid(s) are evaluated and a determination is made whether the received bid(s) satisfy the fund requirements. Each bid is supported by specimen lists of investments that the respective investment manager favors in light of the fundamental return. The bidding and evaluation process is an on-going, interactive process between trustees 105 and the respective investment managers. Additionally, if each of the received bids does not satisfy the fund requirements, one or more additional investment managers are identified in 215 and the bidding and evaluation process is repeated.

At the conclusion of the evaluation process, investment manager 120 is appointed and investment manager 120 receives access to capital 115, in 230. Capital 115 is invested in accordance with mandate 130 as set forth below to achieve the goals set by trustees 105.

Regardless if the investments are associated with equities, bonds, physical assets such as direct property investments or a combination thereof, investment manager 120 submits generated performance reports to trustees 105 during the predefined term and/or after the predefined term, in 235. Based on the performance reports, trustees 105 determine whether investment manager 120 is complying with the terms of mandate 130 and monitor the performance of investment manager 120. Specifically, trustees 105 determine whether the predefined targets in mandate 130 are being met, in 240. In an exemplary embodiment, the performance reports are electronically generated at least in part by software that provides all the necessary figures. Exemplary performance reports are described below with reference to the spreadsheets shown in FIGS. 7, 8 and 9.

Trustees 105 are also better enabled to assess the attractions of one diverse type of investment rather than another type of investment. More particularly, since exemplary mandate 130 reverts to fundamentals, trustees 105 more easily assess the attractiveness of different investments, for example, United Kingdom equities versus United States equities versus United Kingdom fixed interest investments.

Notwithstanding the above, the trustees 105 may conclude that they are not fully competent to assess the relative attractiveness of different investments to the extent of deciding themselves on an allocation between the different asset classes such as United Kingdom equities and United States equities but conclude that: either investment manager 120 possesses the appropriate expertise to make such decisions or, in the investment mandate 130 he is given, investment manager 120 is permitted to invest in securities in a number of different asset classes without rigid constraints placed on his overall asset allocation.

Equity Investment Examples

The exemplary embodiments of the present application are further described below with reference to FIG. 3 for an income investment mandate associated with equity investments, wherein the value indicator is the dividend. According to such a mandate, referred to in the equity examples as mandate 130, income is reinvested. The following is merely an example, including the selected values.

Trustees 105 accept the advice of an actuary that the objects of a particular fund are likely to be fulfilled if a rate of return over the next five years is approximately 7% per annum. Trustees 105 invite bids from a number of investment managers to manage $100 million to achieve, on average over the next five years, a fundamental return of 7% per annum. After discussions and various re-tenderings, trustees 105 need to decide between two investment managers, manager A or manager B. Manager A suggests an initial dividend yield of 4% and growth in dividends of 3% and manager B suggests an initial dividend yield of 3% with a dividend growth rate of 4%. Both investment managers present a fundamental return of 7.12% per annum determined according to the following equation:

$$FR=(((1+y/100)*(1+g/100))-1)*100 \quad (2)$$

wherein y=initial dividend yield of 4% and g=dividend growth rate of 3%. Trustees 105 are not so confident of dividend growth and therefore lean towards a higher yielding portfolio. Trustees 105 therefore choose investment manager A, referred to in this example as investment manager 120.

The goals of investment manager 120 are specifically defined in mandate 130, the goals being to invest $100 million, referred to in this example as capital 115 and designated in FIG. 3 as capital employed, in stocks with an average initial dividend yield of 4%. The table depicted in FIG. 3 or the like, or data indicated in at least a portion of the table, can be included in mandate 130. Investment manager 120 is granted the discretion to keep liquid up to 2% of the portfolio at any given time. As shown in FIG. 3, in year 1, investment manager 120 actually has a goal to achieve dividend income of $4.06 million, as opposed to $4 million (4% of $100 million). This slightly stretched target recognizes that dividends will be received throughout the year and by the end of the year some of the required 3% growth in the dividend stream should be noticeable. Thus, the dividend yield is 4.06%. In this example, trustees 105 have instructed investment manager 120 to re-invest dividends as received. Alternatively, as described below with reference to FIG. 4, at least a portion of the income can be withdrawn.

At the end of year 1, capital employed is increased from $100 million to $107.12 million and the dividend income goal for year 2 is increased to $4.349 million, as shown in FIG. 3. The capital employed is increased by $7.12 million at end of year 1 because of the fundamental return being 7.12%. Additionally, the year 2 dividend income goal is determined by multiplying the capital employed at the end of year 1 by a dividend yield of 4.06%, that is, $107.12*0.0406=$4.349 million.

At the end of year 2, capital employed is increased from $107.120 million to $114.747 million and the dividend income goal for year 3 is increased to $4.659 million, as shown in FIG. 3. The capital employed is increased by approximately $7.63 million because of the fundamental return of 7.12%, that is, ($107.120×1.0712)−$107.120=$7.63 million. The year 3 dividend income goal is determined by multiplying the capital employed at the end of year 2 by a dividend yield of 4.06%, that is, $114.747*0.0406=$4.65 million.

The targets for investment manager 120 for the remaining three years are shown in FIG. 3 and determined similarly as described above for the first two years of the term.

In an exemplary embodiment, at the end of each year, trustees 105 are given a performance report by investment manager 120 or investment advisor 110 depicting the actual amount of dividends received and how the portfolio's market value compared with the then capital employed during the respective years. Alternatively, the report can be issued more or less frequently to trustees 105. The difference between the portfolio's market value for a particular year and the capital employed during that year is referred to herein as the revaluation effect, that is, the change in value that is attributable to market sentiment as opposed to any change in fundamentals. In an exemplary embodiment, the revaluation effect is measured after deducting from capital employed the out-performance of investment manager 120 (positive or negative) regarding dividend received.

Although investment manager 120 is not interested in revaluation at the portfolio level as a basis for determining its performance, trustees 105 are provided a transparent view of the overall progress of the portfolio for an income investment mandate in dividend reinvestment mode. For example, if the portfolio's market value equals the then capital employed, trustees 105 can conclude that the rate of return since initiation is equal to the fundamental return. Any excess or shortfall in market value can be interpreted in terms of the average annual return on the average capital employed.

In an exemplary embodiment, even though investment manager 120 concentrates on fostering the growth of dividend income and is not concentrating on performance in light of market value, investment manager 120 sells and buys stocks to enhance the dividend income stream. For example, as the yield on a given stock falls because of favorable market sentiment (a revaluation effect), investment manager 120 sells the respective stock and buys a comparable, but higher yielding stock. Conversely, if a stock is not in favor, but is still considered a suitable holding, investment manager 120 buys the respective stock in order to secure a stream of dividend income on favorable terms. As a result, by reference to the value indicator, for instance, the dividend, investment manager 120 is buying stocks low and selling stocks high. In the present application, although investment manager 120 is not looking for capital gain in market-value terms, capital gain will tend to accrue to the fund by virtue of the pattern of sales and purchases by investment manager 120. Thus, income investment mandate 130 is so structured as to produce favorable revaluation effects in market-value terms over the medium to long run.

In an exemplary mandate, one or more restrictions are placed on the discretion of investment manager 120 so as to ensure that in pursuing an income-enhancement objective, investment manager 120 does not compromise the general quality of the portfolio. For instance, mandate 130 includes a dividend definition, diversification requirement and information regarding quality of holdings. Specifically, mandate 130 defines dividends so as to exclude, for instance, capital distributions. Capital distributions are treated as if they were sale proceeds and are reinvested in the fund without affecting the performance of investment manager 120. Further, mandate 130 requires a reasonable level of diversification and sets bounds to the degree of concentration of holding in any particular business. As to quality of holdings, the mandate requires investment manager 120 to use suitable filter mechanisms so as to exclude from consideration and, indeed, sell out of stocks of businesses with poor credit ratings or poor cash-flows which might cast doubt on the ability to go on paying a growing stream of dividends.

During the term of mandate 130, neither trustees 105 nor investment manager 120 do anything about the overall market value of the portfolio, except to monitor the market value in the above-described manner. If the market value becomes excessively greater than the capital employed, trustees 105 may decide to realize the capital gain by liquidating the portfolio, wholly or partly, with the object of re-investing the proceeds advantageously or switching to cash temporarily.

In the following example, at least one additional parameter referred to as an income withdrawal percentage is included in income investment mandate 130. Trustees 105 are thereby requiring at least a portion of the income to be paid to them. The income withdrawal percentage is a figure specified by trustees 120 at the beginning of each year, the percentage not being greater than the initial dividend yield and is applied to the capital employed at the beginning of the year to give the amount of income that is to be paid to trustees 105, rather than re-invested. For this example described below with reference to the table shown in FIG. 4, initial dividend yield equals 4%, dividend growth rate equals 3% and income withdrawal rate equals 3%. Fundamental return remains 7.12%, but capital employed is not grown each year by a corresponding amount, as described below.

As can be seen in the table of FIG. 4, the dividends required in year 1 remain $4.06 million due to the dividend yield being 4.06%, but $3.045 million of which will be remitted to trustees 105. Thus, $1.015 million will be reinvested and added to the capital employed. The amount remitted to trustees 105 is determined by multiplying $4.06 million, the required dividends in year 1, by 0.75 (3% income withdrawal rate divided by 4% initial dividend yield). At the end of year 1, capital employed is increased by a factor of 1.0403, that is, from $100 million to $104.03 million, reflecting in part the $1.015 million reinvested in the capital employed. The factor is determined by multiplying 1.01 by 1.03. The 1.01 is determined by the equation: (1+((initial dividend yield−income withdrawal rate)/100)), that is, (1+((4−3)/100))=1.01. The 1.03 is determined by the equation: (1+(dividend growth rate/100)), that is, (1+3/100)=1.03.

The required dividend income in year 2 is increased to $4.224 million based on the 4.06% dividend growth (4.06% of $104.03). Additionally, in year 2, the income remitted to trustees 105 is $3.168 million and $1.056 million is reinvested by investment manager 120. The remitted income and the amount reinvested are determined in the same manner as described above for year 1. At the end of year 2, capital employed is increased by a factor of 1.0403, that is, from $104.03 million to $108.222 million. The 1.0403 factor is used each year during the term, assuming trustees 105 do not change the income withdrawal requirement from the nominal 3% in the first year. Alternatively, trustees 105 change the income withdrawal requirement for subsequent years of the term so that the factor does not remain the same throughout the term. The targets for investment manager 120 for the remaining years during the five year term are shown in the table of FIG. 4 and calculated in same manner as described above for year 1 and year 2.

In the above-described exemplary embodiments, the value indicator is the dividend. In an alternative embodiment, the value indicator is earnings for a portfolio composed of equities. A mandate based on earnings requires an investment manager to select stocks that exhibit a specified rate of growth in earnings. Although such stocks may have a modest amount of dividend income, most of the growth in capital employed comes from the specified growth rate in earnings.

Bond Investment Examples

In a further exemplary embodiment of the present application, a mandate, again referred to as mandate 130, is constructed based on bond investments, and, as a result, investment manager 120 manages a bond portfolio, as opposed to an equity portfolio described above. The exemplary steps 210 through 240 described above for equity investments are similar for bond investments and, thus, are not again described for the bond examples. As will be appreciated by a person having ordinary skill in the art, the differences, however, include parameters in mandate 130 specifically tailored to bond investing and the enumerated targets.

Mandate 130 between investment manager 120 and trustees 105 includes several parameters, including a predefined term, for example, five years, and a value indicator, such as fair value. Mandate 130 will also set forth that performance determinations will not be based on market value or a market-based rate of return. Instead, the performance of investment manager 120 is monitored by comparing the capital employed at the end of a particular year with the aggregate of the accumulated interest and the fair value of the portfolio at the end of that year, as will be described below with reference to FIG. 6. Capital employed and fundamental return will also be defined in mandate 130 in a similar manner as described above with reference to equity investments.

Figure 5:
FIG. 5 illustrates an exemplary table of capital employed and required interest on a reinvestment basis for bond investment.

An exemplary embodiment is described below with reference to FIGS. 5 and 6 for a bond portfolio having a five year term remaining to redemption. Income which is interest earned on the bond is assumed to be received in the form of half yearly installments. The installments are assumed to be placed in a bank deposit account yielding the fundamental rate of return upon receipt. Thus, at the end of the five year term, the portfolio will have a value equal to the redemption value plus the accumulated income over the five year term. The redemption value is realized by repayment at maturity.

In the following examples, the initial capital employed is received and invested by investment manager 120 in a bond selected by investment manager 120 such that the objectives of mandate 130 will be achieved. The fundamental rate of return is the bond's yield to redemption (also known as the yield to maturity) at the start of the term defined in mandate 130. The fundamental rate of return consists of an income element and a capital element if the bond is priced at a premium because of a high coupon. On the other hand, if the bond is priced at par, the fundamental rate of return only consists of an income element. The initial value of the bond is measured by whether the initial running yield is greater than or less than the yield to redemption. As a result, if the initial running yield is less than the yield to redemption, there is a positive capital element, if the initial running yield is greater than the yield to redemption there is a negative capital element and if both yields are the same, there is no capital element. The target income (interest) each year is calculated by applying the initial running yield to the capital employed at the beginning of each year. In a schedule of target income (interest), this automatically allows for interest on the bank deposit account arising from the income accumulation process at the fundamental rate of return, as described below.

The following is merely an example, including the selected values. In this example, investment manager 120 acquires a bond having an 8.5% semi-annual coupon stock purchased at $114.62 million per $100 million nominal with an initial running yield of 7.416% p.a. and a yield to redemption of 5.214% p.a. The fundamental return of this bond purchased at a premium to par has a negative capital element since the yield to redemption is less than the initial running yield. The worth of the bond will decline over the five year term until the bond reaches its redemption price of $100 million.

The initial running yield represented as a percentage ("IRY") is determined as follows:

$$IRY = (coupon\ percent/purchase\ price)*100 \quad (3)$$

For example, the initial running yield=(8.5/114.612)*100=7.416%. The yield to redemption of 5.214% is determined as with all yield to redemption calculations—as the yield, for instance, annual yield, such that the sum of cash flows (interest plus redemption value) of the bond discounted by that yield results in a net present value equal to the price of the bond, in this example, $114.62 million. As will be appreciated by a person having ordinary skill in the art, FIGS. 5 and 6 do not actually reflect a bond purchased at $100 million. Rather, a portfolio of $100 million worth of bonds priced at $114.62 million are purchased, that is, 872,451 bonds are purchased.

The table shown in FIG. 6 illustrates exemplary targets of investment manager 120. As noted above, the targets, the rates, the percentages, the bond purchase price and the redemption price are merely illustrative. The required interest in year 1 of $7.512 million (7.512% of $100 million initial capital employed) is determined according to an income accumulation process at the fundamental rate of return. The 7.514 percentage reflects there being two coupons for year 1, one of which earns interest for half of a year at the fundamental rate of return (the yield to redemption). Specifically, the required interest percentage ("RIP") is determined according to the following equation:

$$RIP = ((\tfrac{1}{2}*initial\ running\ yield)*(1+((\tfrac{1}{2}*FRR)/100)))+(\tfrac{1}{2}*initial\ running\ yield) \quad (4)$$

For example, the RIP=(($\tfrac{1}{2}$*7.416)*1+(($\tfrac{1}{2}$*5.214)/100)))+($\tfrac{1}{2}$*7.416)=7.512. As can be seen in FIG. 5, since the rate is 7.512% and the initial capital employed is $100 million, the required interest in year 1 is $7.512 million. Further, since the fundamental rate of return (the yield to redemption) is 5.214%, the capital employed at the end of year 1 is increased by $5.214 million to $105.214 million. The capital employed grows each year by the fundamental rate of return of 5.214%, as shown in FIG. 5. The required interest also grows each year by 5.214%, i.e., the first column of the table shown in FIG. 5 represents the reinvestment of the income at the 5.214% fundamental rate of return (the yield to redemption). Thus, each year capital employed generates income at 7.512%, but as the capital employed only rises by 5.214%, the increase in the required interest likewise is 5.214% each year. It is assumed that the proceeds of the bond can be invested throughout in cash deposit that always pays 5.214% interest. The capital write-off column of the table in FIG. 5 represents the decrease in fair value each year—the bond was purchased at a premium. For instance, since the required interest in year 1 is $7.512 million and the capital employed increases by $5.214 million due to a fundamental rate of return of 5.214%, the capital write-off for year 1 is $2.298 million. Similar calculations are performed for the remaining four years of the term.

As noted above and described in detail below with reference to FIG. 6, the performance of investment manager 120 is measured by comparing the capital employed with the aggregate of the accumulated bond interest and the fair value of the bond. Fair value is based on the price at which the bond has a gross redemption yield to the termination date of mandate 130 equal to the fundamental rate of return. Thus, at the termination date, for example, after five years, the fair value of the bond will be equal to the market value, which corresponds to the redemption price of the bond assuming no default, in this example, $87.2451 million. For this example, fair value is the value indicator, the value indicator being used by investment manager 120 to decide whether to purchase or sell a stock.

The table depicted in FIG. 6 illustrates the progress through time of fair value of the bond. As can be seen, the fair value for a particular year represents the difference between the respective accumulated interest and capital employed for that year. Further, fair value on any given date is the net present value of the remaining cash flows on that date, ignoring any past cash flows, discounted at the fundamental rate of return. By referring to the required interest in FIG. 5, the accumulated interest for each year is determined. Further, as described above with reference to FIG. 5, since the fundamental rate of return (the yield to redemption) is 5.214%, the capital employed at the end of year 1 is $105.214 million. The capital employed grows each year by 5.214%.

In the above example, it has been assumed that a buy and hold regime was strictly adhered to by investment manager 120 and interest on bank deposits of an amount equal to the fundamental rate of return was the assumed rate throughout. Hence, out-performance was not sought or achieved by investment manager 120. Such a portfolio would achieve an absolute return targeted at 5.214% per annum. In an alternative embodiment, investment manager 120 engages in active management, as opposed to a buy and hold approach.

In particular, investment manager 120 strives to outperform the targets set forth in mandate 130 by selling bonds above fair value, by buying bonds below fair value and/or by reinvesting income at a higher rate than the fundamental rate of return. Performance is not be measured by reference to the market value, but rather by comparing capital employed with the fair value of bond(s) and the amount of any cash, such as interest.

In another alternative embodiment, since the exemplary embodiments are equally applicable to equities and bonds, an exemplary investment mandate extends investment manager 120 the freedom to switch between asset classes, albeit within certain parameters laid down by trustees 105 in the mandate.

In the exemplary embodiments of the present application, asset allocation decisions are not considered more important than, for instance, the selection of the individual investments. As a result, conventional asset liability studies are not required. When, however, trustees 105 find themselves required to allocate the fund between one asset class and another, the exemplary embodiments described herein allow trustees 105 to make such decisions without being an expert in asset allocation. Specifically, given the iterative process when the award of a mandate is contemplated as described above with reference to FIG. 2, trustees 105 are offered a clear indication of what trustees 105 can reasonably expect to get from any particular market over the chosen term, for example, over the next five years, should trustees 105 wish to commit money to that market. Hence, trustees 105 can compare one asset class with another asset class, the default choice being to keep the funds on deposit.

Further, in light of the exemplary embodiments, a direct and proper relationship is established between trustees 105 and investment manager 120. Investment advisor 110 will advise the trustees 105 on such matters as the content of the mandate 130, the initial selection of an investment manager 120 to implement the mandate 130 and the continued suitability of the said investment manager to implement the said mandate and may provide investment performance monitoring services. Investment advisor 110 may also advise the parties on maintaining the integrity of the process.

Additionally, in the exemplary embodiments of the present application, market value changes are analyzed separately from returns on investment, for instance, fundamental return. Fundamental return takes into account initial yield and income growth and is susceptible to the expertise of investment manager 120. Fundamental return can also be pursued over a longer term, whereas market value changes are necessarily short term in nature, being something that may eventually even itself out, as the market reverts to some normative value. Given their transitory nature, market value changes are not systematically predictable.

A common thread between the exemplary equity investment embodiments and the exemplary bond investment embodiments described herein is that the performance measurement system induces the investment manager to pursue the acquisition of long term value in securities, e.g., up to five years, rather than be swayed by short term or speculative bets on near term market value changes. Given that stock markets are inefficient over such periods of time and the tendency for security prices to revert to fair value at intervals, it is very probable the fundamental return will be achieved, on average, over the term of the mandate. Thus, only by ignoring aggregate market value changes can the investment manager expect to outperform consistently in market value terms.

Figure 7B:
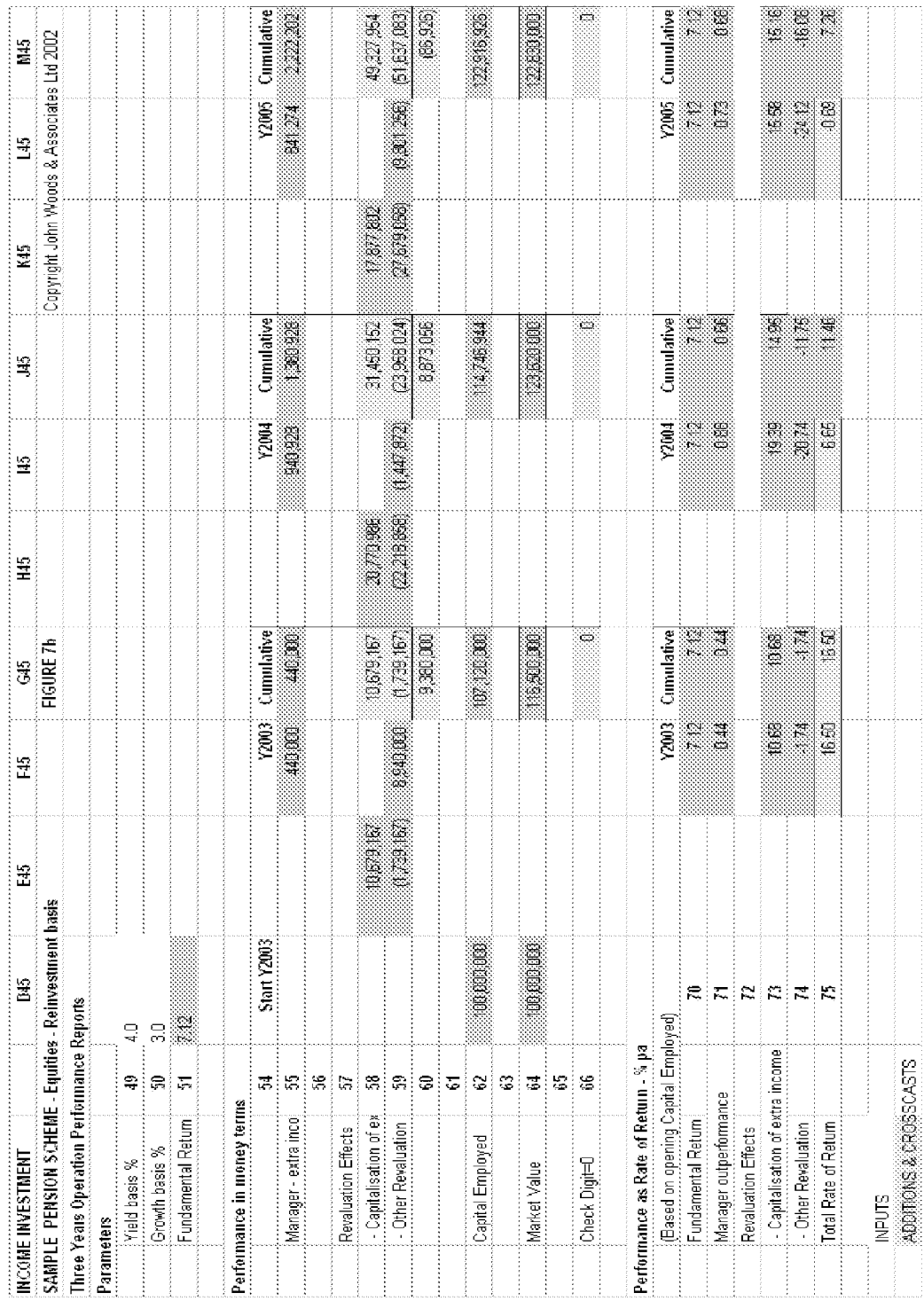
Figure 8B:
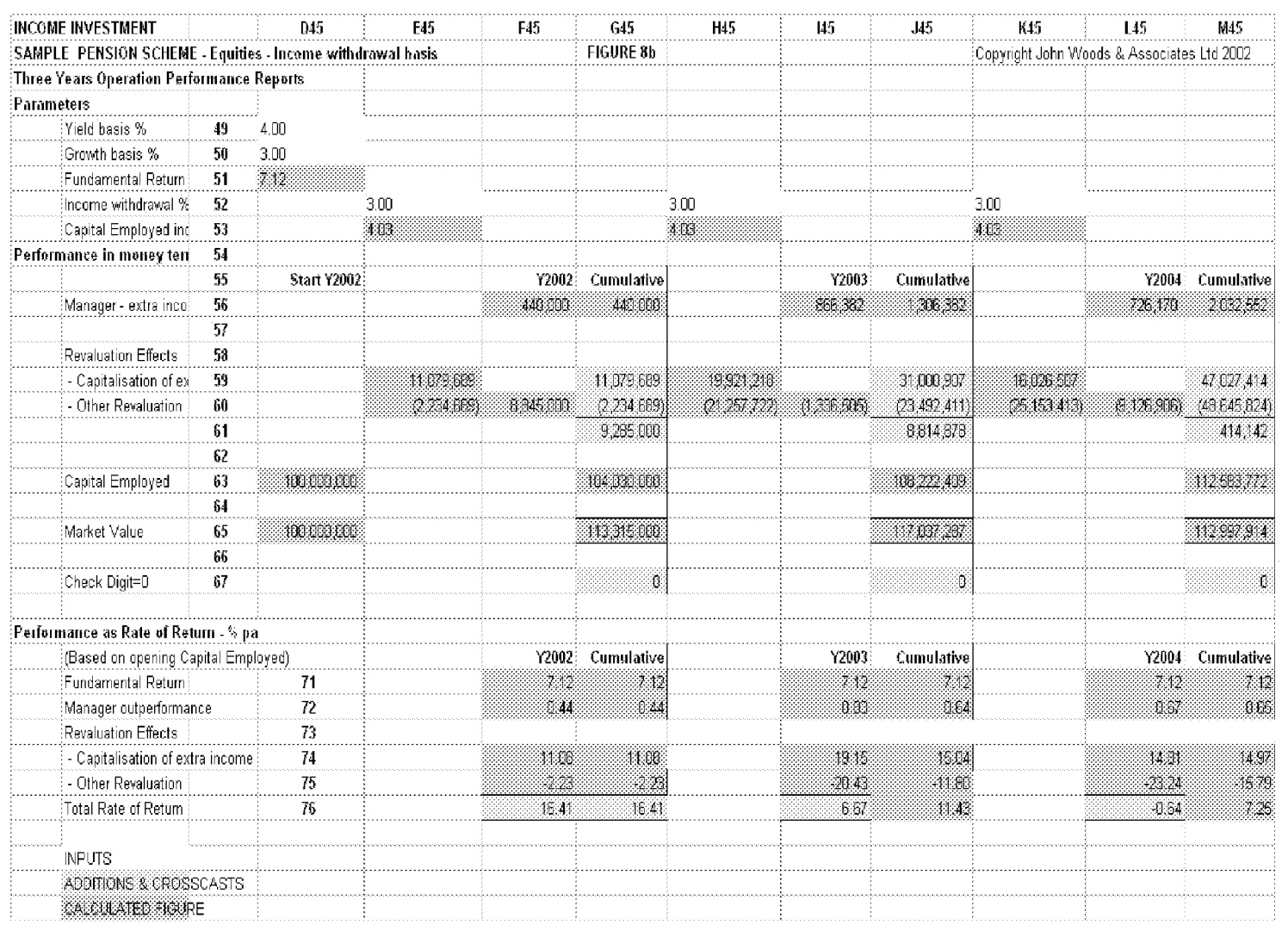
Figure 9B:
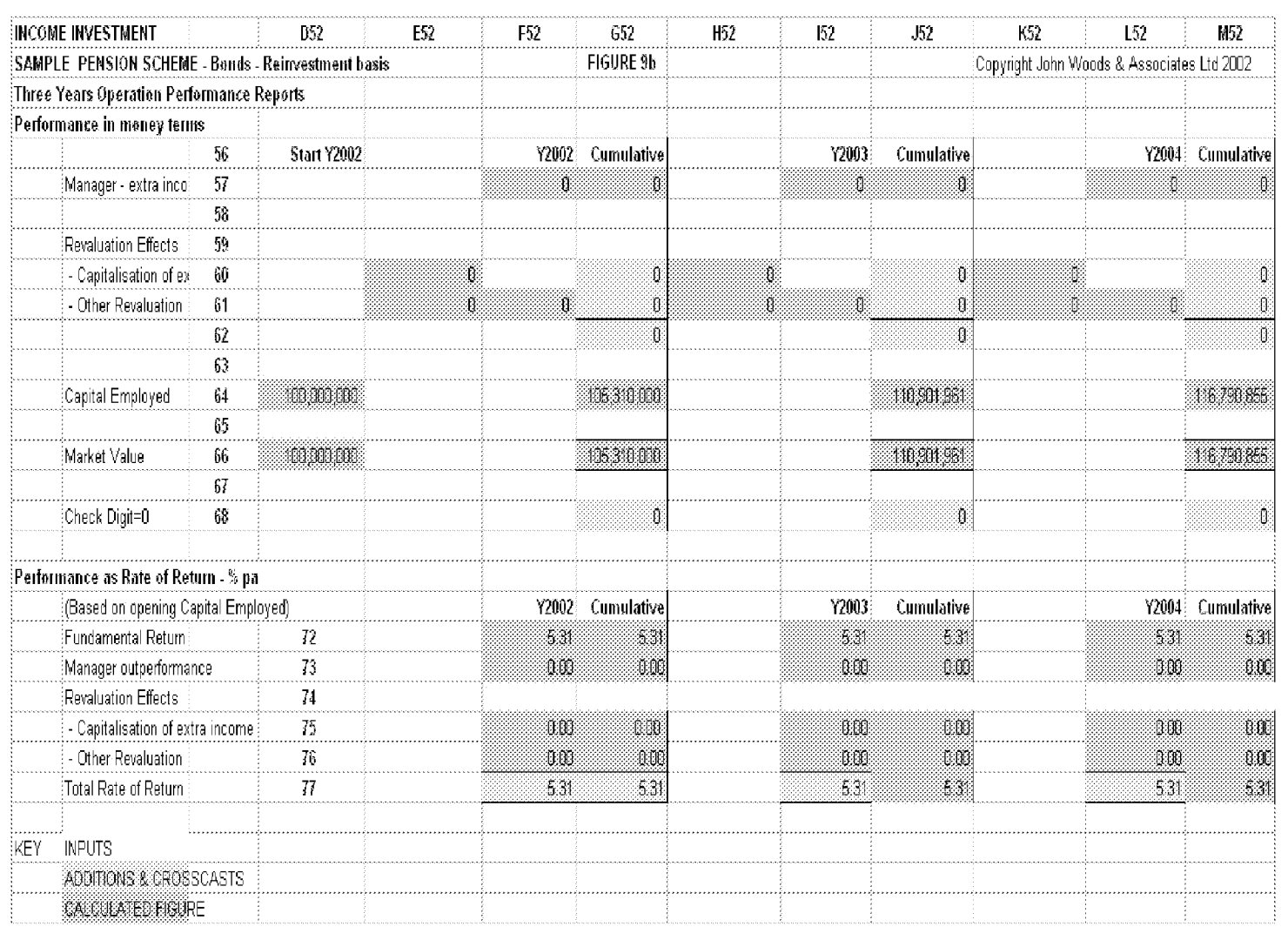

The exemplary embodiments described in the present application fit in particularly well with any arrangement for an investment manager to be remunerated wholly or partly by an incentive element. The incentive element is appropriate because, in general, all extra performance is represented by regular extra cash flow so that the investment manager's incentive element will not be paid out of capital gain that may turn out to be transient. FIGS. 7a through 9b illustrate exemplary spreadsheets, the content and figures of which are determined according to the exemplary embodiments of the present application. Specifically, FIGS. 7a and 7b illustrate an exemplary spreadsheet of the salient figures that arise in a portfolio of equities when operating mandate 130 on the basis that investment manager 120 reinvests the income. FIGS. 8a and 8b illustrate an exemplary spreadsheet of the salient figures that arise when operating mandate 130 for a portfolio of equities on the basis that investment manager 120 does not reinvest all the income. FIGS. 9a and 9b illustrate an exemplary spreadsheet of the salient figures that arise when operating mandate 130 on the basis that investment manager 120 invests solely in bonds and reinvests the income. The software used to generate the exemplary spreadsheets is Microsoft® Excel® 97. Other software applications, alone or in combination, can also be used.

Each cell of the exemplary spreadsheets shown in FIGS. 7a through 9b that has a value has one of three shadings as background indicating inputs, additions and cross casts, and calculated figures.

Referring to FIGS. 7a and 7b, it is assumed that investment manager 120 is given $100 million to invest on the first day of the year 1 in an equity portfolio, on the basis that income will be reinvested and no further capital will be handed over to or withdrawn from investment manager 120 in the three years exemplified. Column D is used to set up the initial position. To be practical, $2 million is set aside as operating cash within the portfolio at cell D15, with the remaining $98 million entered as the initial book cost of the securities purchased at D12. It has been decided that the initial market value of the securities is also $98 million. Another value could also be put in D14. D13 returns any difference between book cost and market value. Row 13 is essentially a dependant of row 14. The total assets of $100 million is returned at D25 and deemed to be the initial capital employed at D38.

The mandate parameters are a yield basis of 4.0% and a growth basis of 3.0%. These parameters are entered at D49 and D50, respectively, causing D51 to return 7.12% as the target fundamental return. Time moves from left to right, with a column for the initial position and then three columns for each year. FIG. 7a summarizes the values in the investment books for the account and FIG. 7b summarizes the performance numbers. Rows 9 to 23 show the development through time of the assets and liabilities, with the total assets at row 25. Rows 27 to 38 show that total in terms of income, expenditure and capital employed. A row of check digits at row 40 triggers an alert if the upper and lower sections do not agree.

The investment transactions for the first year are entered in column E with the market value at the year end put in G14. In the input cells in the range E9 to E23, the increases or decreases in the assets and liabilities that have taken place in the year are entered, with the income and expenditure items in the range E27 to E33, so as to produce a reconciliation, as indicated by the check digit at E40 being zero. The investment income figure at E27 needs to accord with the definition of income under mandate 130, any non-qualifying element being put in E33 (or on a separate line in the net market movement cell). Various items are put in cells with the sub-total being returned and the three items in the calculated figures cells being derived from the inputted information.

Column F is then completed by calculating in F38 the increase in capital employed required by mandate 130 based on the fundamental return rate from D51 applied to the opening figure of capital employed in D38. The re-invested income element (in F29) and the target growth (in F36) are based on D38, applying the yield and growth parameters of D49 and D50. A zero check digit at F40 confirms that the two components of the increase in the capital employed do agree with the figure at F38.

In column G, a cross-cast of columns D, E and F (apart from G14, as described above) is performed, producing in effect, a trial balance of the fund's position at the end of the year. The boxed items are dealt with at sub-total levels in the cross-casts. In this example, the total assets of $116.5 million (at G25) represents extra income generated by investment manager 120 of $440,000 (at G29), two capital appreciation items (G34 and G36) which net off to $8.94 million and the capital employed figure of $107.12 million (at G38).

The figure depicted at G34 is the usual balancing figure to show the increase in market value, the detail being in E31 to E33. G36, simply brought across from F36 is the minimum such increase that would have enabled the portfolio to show a nil revaluation effect, as also shown in E58 and E59 of the performance reports.

The procedure for the first year is repeated for the next two years, the cross-casting providing each time the up-to-date position respectively in columns J and M. The market value falls in year three, as shown by the negative value at K13. Fortunately, the investment manager's performance in producing a rising stream of income has been successful with an extra $2,222,202 million generated in the three years, as shown at M29.

In FIG. 7b, the performance in money terms section has three columns, the figures in the second and third columns being read down from FIG. 7a. As can be seen, the revaluation effects figure is split. The first item is the extra market value that would have been needed at the end of the year if the extra income generated by investment manager 120 was not to cause the yield on the portfolio to rise. It is a pro rata calculation based on the total income received and the year end total market value. E59 is a balancing figure.

The figures in the performance as rate of return section of FIG. 7b are all based on a denominator of the capital employed at the beginning of the year. The first figure is the fundamental return. The other three rate of return figures, F71, F73, F74 are calculated from the corresponding money term numbers.

Cumulative annualized rates are given for the second and third years (in columns J and M), apart from the fundamental return which is invariable. The rates are found by chain linking each year's numbers and taking the appropriate root. Because of different weightings, the cumulative total rate of return (J75 and M75) only approximately corresponds to the total of the figures above it.

The following formulae are used for determining at least some of the figures in the exemplary spreadsheet shown in FIGS. 7a and 7b with yield basis % being "y", growth basis % being "g", and fundamental return % being "r":
Fundamental return is given by: $1+r/100(1+y/100)*(1+g/100)$;
Total Increase in Capital Employed is given by: Opening Capital Employed*$r/100$;
Target Income is given by: Opening Capital Employed*$y$*$(1+g/200)/100$; and
Target Growth is given by: Opening Capital Employed*$g$*$(1+y/200)/100$.

The following demonstrates that Total Increase in Capital Employed equals Target Income plus Target Growth. By dividing the expression for Total Increase in Capital Employed by the Opening Capital and adding 1 the following results: $1+r/100$, i.e., the left hand side of the Fundamental Return equation. Then, aggregating the Target Income expression and the Target Growth expression and doing the following results:

$1+y*(1+g/200)/100+g*(1+y/200)/100$ which equals $1+(y+yg/200+g+yg/200)/100$ which equals $1+(y+g+yg/100)/100$ which equals $1+y/100+g/100+yg/10000$ which equals $(1+y/100)*(1+g/100)$ which is the right hand side of the Fundamental Return equation.

The exemplary spreadsheet shown in FIGS. 8a and 8b provides an example of the salient figures that arise when operating mandate 130 on the basis that investment manager 120 does not re-invest all the income. The exemplary spreadsheet covers the first three years of mandate 130. The software used to generate the exemplary spreadsheet is Microsoft® Excel® 97. Other software applications, alone or in combination, can also be used.

Referring to FIGS. 8a and 8b, it is assumed that investment manager 120 is given $100 million to invest on the first of a year in equities, on the basis that a specified amount of income (not exceeding the amount targeted for investment manager 120 for the year concerned) will be paid to trustees 105. Apart from that, nothing further will be withdrawn from or handed over to investment manager 120 in the three years exemplified.

Column D is used to set up the initial position. To be practical, $2 million is set aside as operating cash within the portfolio at cell D15, with the remaining $98 million entered as the initial book cost of the securities purchased at D12. It has been decided that the initial market value of the securities is also $98 million. Another value can be put in D14. D13 returns any difference between book cost and market value. Row 13 is essentially a dependant of row 14.

The total assets of $100 million is returned at D25 and deemed to be the initial capital employed at D38. Further, the mandate parameters are: yield basis of 4.0% at D49; growth basis of 3.0% at D50; and income withdrawal basis of 3.0% each year. The income withdrawal percentage can be varied each year which would be reflected in E52, H52 and K52. The entries at E52, H52 and K52 cause at least the entry at E53 to return the rate of increase in capital employed of 4.03% in each of the years. Time moves from left to right, with a column for the initial position and then three columns for each year. FIG. 8a summarizes the values in the investment books of account and FIG. 8b summarizes the performance numbers.

Rows 9 to 23 show the development through time of the assets and liabilities, with the total assets at row 25. Rows 27 to 38 explain that total in terms of income, expenditure and capital employed. A row of check digits at row 40 triggers an alert if the upper and lower sections do not agree.

The investment transactions for the first year are entered in column E, with the market value at the year end put in G14. In the input cells in the range E9 to E23, the increases or decreases in the assets and liabilities that have taken place in the year are entered, with the income and expenditure items in the range E27 to E33, so as to produce a reconciliation, as indicated by the check digit at E40 being zero. The investment income figure at E27 needs to accord with the definition of income under mandate 130, any non-qualifying element being put in E33 (or a separate line in the net market movement cell). Various items are put in cells, with the sub-total being returned and the three items in the calculated figures cells being derived from the inputted information. The payments to trustees 105 on account of income go into E23. The percentage of capital employed which trustees 105 wish to withdraw from income is stated at E52. The percentage does not exceed the D49 yield basis figure.

Column F is then completed by calculating in F38 the increase in capital employed required by mandate 130 based on the percentage at E53 applied to the opening figure of capital employed in D38. The re-invested income element, if any, (in F29) and the target growth (in F36) are based on D38, applying the yield and growth parameters of D49 and D50, as well as the income withdrawal rate parameter entered at E52, as described below. A zero check digit at F40 confirms that the two components of the increase in the capital employed agree with the figure at F38.

Column G then does a cross-cast of columns D, E and F producing, in effect, a trial balance of the fund's position at the end of the year. The boxed items are dealt with at a sub-total level in the cross-casts. In the example, the total assets of $113.315 million (at G25) represent the extra income generated by the investment manager of $440,000 (at G29), two capital appreciation items (G34 and G36) that net off to $8.845 million and the capital employed figure of $104.03 million at G38.

G34 is the usual balancing figure to show the increase in market value, the detail being in E31 to E33. G36, simply brought across from F36, is the minimum such increase that would have enabled the portfolio to show a nil revaluation effect, shown at E58 and E59 of the performance reports in FIG. 8b.

The procedure for the first year is repeated for the next two years, the cross-casting providing each time the up to date position respectively in columns J and M. The market value falls in year three, as shown by the negative value at K13. Fortunately, the investment manager's performance in producing a rising stream of income has been successful with an extra $2,032,552 generated in the three years, as shown at M29.

In FIG. 8b, the performance in money terms section of the exemplary spreadsheet has three columns, the figures in the second and third columns being read down from FIG. 8a. As can be seen, the revaluation effects figure is split. The first item is the extra market value that would have been needed at the end of the year if the extra income generated by investment manager 120 was not to cause the yield on the portfolio to rise. It is a pro rata calculation based on the total income received and the year end total market value. E60 is a balancing figure.

The performance as rate of return figures shown in FIG. 8b are all based on a denominator of the capital employed at the beginning of the year. The first figure is the fundamental return (from D51). The other three rate of return figures at F72, F74 and F75 are calculated from the corresponding money terms numbers.

Cumulative annualized rates are given for the next two years in columns J and M, apart from the fundamental return, which is invariable. The rates are found by chain linking each year's numbers and taking the appropriate root. Because of different weightings, the cumulative total rate of return (J76 and M76) only approximately corresponds to the total of the figures above it.

The following formulae are used for determined at least some of the figures in the exemplary spreadsheet shown in FIGS. 8a and 8b with yield basis % being "y", growth basis % being "g", income withdrawal % being "i" and capital employed increase % being "c":

Fundamental Relationship of above given by: $1+c/100(1+(y-i)/100)*(1+g/100)$; and
Total Increase in Capital Employed given by: Opening Capital Employed*$c/100$.
Target Income is split into Income Credited to Trustees and Income Deemed Reinvested in Capital Employed. Specifically, Target Income is given by: Opening Capital Employed*$y*(1+g/200)/100$;
Income credited to Trustees is given by: Opening Capital Employed*$i*(1+g/200)/100$; and
Income Deemed Reinvested in Capital Employed is given by: Opening Capital Employed*$(y-i)*(1+g/200)/100$.
Lastly, Target Growth is given by: Opening Capital Employed*$g*(1+(y-i)/200)/100$.

The following demonstrates that Total Increase in Capital Employed equals Target Income plus Target Growth. By dividing the Total Increase in Capital Employed expression by the Opening Capital and adding 1, the following results: $1+c/100$, i.e., the left hand side of above-described Fundamental Relationship equation. Then, by aggregating Income Deemed Reinvested in Capital Employed expression and the Target Growth expression and doing the same following results:

$$1+(y-i)*(1+g/200)/100+g*(1+(y-i)/200)/100 \text{ which equals}$$

$$1+[((y-i)+(y-i)*g/200+g+(y-i)*g/200)]/100 \text{ which equals}$$

$$1+[(y-i)+g+(y-i)*g/100]/100 \text{ which equals}$$

$$1+(y-i)/100+g/100+(y-i)*g/10000 \text{ which equals}$$

$$(1+(y-i)/100)*(1+g/100) \text{ which is the right hand side of the Fundamental Relationship equation.}$$

The exemplary spreadsheet shown in FIGS. 9a and 9b provide an example of the salient figures that arise when operating income investment mandate 130 on the basis that investment manager 120 invests solely in bonds and reinvests the income. The exemplary spreadsheets cover three years of a five year mandate term. This particular example is the fundamental case where investment manager 120 achieves no out-performance and the market value happens to be the same as the fair value at each valuation date. The software used to generate the exemplary spreadsheet is Microsoft® Excel® 97. Other software applications, alone or in combination, can also be used.

Referring to FIGS. 9a and 9b, it is assumed that investment manager 120 is given $100 million to invest on the first of the year in a single bond maturing at par five years later. The income is accumulated on deposit at a rate of interest equal to the initial yield to redemption of the stock (5.214% p.a.). No further capital is handed over to or withdrawn from investment manager 120 during the term of mandate 130.

Column D is used to set up the initial position. Row 13 returns any difference between book cost at row 12 and market value at row 14. The total assets of $100 million are returned at D25 and deemed to be the initial capital employed at D38.

The mandate parameters are a yield basis or a running yield of 7.4158%, a redemption yield of 5.214%, and an income re-investment rate of 5.214%. These parameters are entered at D46, D47 and D48, respectively. Because the redemption yield is the lower figure, the capital value of the bond will diminish until it reaches its redemption value at the end of the five years. Further, time moves from left to right, with a column for the initial position and then three columns for each year on FIGS. 9a and 9b. FIG. 9a summarizes the values in the investment books of the account and FIG. 9b summarizes the performance numbers.

Rows 9 to 23 show the development through time of the assets and liabilities with the total assets at row 25. Rows 27 to 38 explain that total in terms of income, expenditure and capital employed. A row of check digits at row 40 triggers an alert if the upper and lower sections do not agree.

The initial purchase of the bond is recorded in E8 and E15. The only other transaction of the year is the receipt of two coupons of interest. For convenience, the figure is worked out in F45, F46 and F47, the book entries being at E27 and E20. When, at the end of the year, the market value of the bond is put in G14, the necessary write down of the book cost appears at E13 and E31, which completes column E. The market value in this basic example is taken to be equal to the fair value, as worked out in G48, based on the table depicted in FIG. 6.

In the input cells in the range E9 to E23, the increases or decreases in the assets and liabilities that have taken place in the year are entered, with the income and expenditure items in the range E27 to E33, so as to produce a reconciliation, as indicated by the check digit at E40 being zero. Various items are put in cells with the sub-total being returned and the three items in the calculated figures cells being derived from the inputted information.

Column F is then computed by calculating in F38 the increase in capital employed required by mandate 130 based on the redemption yield in D47 applied to the opening figure of capital employed in D38. The re-invested income element (in F29) in the first year is equal to F48 and the target growth (in F34) is a balancing figure, i.e., the difference between F38 and F29.

Column G then does a cross-cast of columns D, E and F producing, in effect, a trial balance of the fund's position at the end of the year. The boxed items are dealt with at a sub-totals level in the cross-casts. In the example, the total assets figure of $105.214 million (at G25) comprises the bond at a fair/market value of $97,701,525 and the accumulated income of $7,512,475.

The procedure for the first year is repeated for the next four years, the cross-casting providing each time the up-to-date position respectively in columns J and M of FIG. 9a. The numbers in column M of FIGS. 9a and 9b are automatically read into columns for later years. In particular, the target investment income in, for instance, 129, is found by taking the difference between 148 and F48. Likewise, the fair value of the bond is available at each year end on line 48 and this particular no outperformance example is used as the market value at J14 and M14 of FIG. 9a. Also, the sale of the investment has been made equal to the then fair value per J48.

The performance section shown in FIG. 9b is described below for the particular no outperformance example described above. The performance in money terms section of the exemplary spreadsheet has three columns, the figures in the second and third columns being read down from FIG. 9a as appropriate. As can be seen, the revaluation effects figure is split. The first item is the extra market value that would have been needed at the end of the year if the extra income generated by investment manager 120 was not to cause the yield on the portfolio to rise. It is a calculation based on capitalizing the extra income at the redemption yield. E61 is a balancing figure.

The figures shown in the performance as rate of return section are all based on a denominator of the capital employed at the beginning of the year. The first figure is simply the fundamental return. The other three rate of return figures, F73, F75 and F76, are calculated from the corresponding money terms numbers.

Cumulative annualized rates are given for the second year and the third year in columns J and M, respectively, apart from the fundamental return which is invariable. The rates are found by chain linking each year's numbers and taking the appropriate root. Because of different weightings the cumulative total rate of return (J75, M75, etc.) would normally correspond only approximately to the total of the figures above it. The embodiments described above are illustrative examples of the present application and it should not be construed that the present application is limited to these particular embodiments.

Various changes and modifications may be effected by one skilled in the art without departing from the spirit or scope of the invention as defined in the appended claims.

What is claimed is:

1. A computer-implemented method for managing institutional investment portfolios on a dividend reinvestment basis during a mandate term, the method comprising:
   (a) determining, by a computer, an average initial dividend yield;
   (b) determining, by the computer, a fundamental rate of return;
   (c) allocating, by the computer, an initial amount of institutional capital to be invested during the mandate term in equity-based investments;
   (d) establishing, by the computer, a first dividend goal for a first period of the mandate term, the first dividend goal determined by multiplying the initial amount of capital by the average initial dividend yield;
   (e) generating, by the computer, a second amount of capital for a second period of the mandate term by increasing the initial amount of capital during the first period by the fundamental rate of return;
   (f) generating, by the computer, a second dividend goal for a second period of the mandate term, the second dividend goal determined by multiplying the second amount of capital by the average initial dividend yield; and
   (g) repeating (e) and (f), by the computer, for any subsequent periods of the mandate term based on the amount of capital and the dividend goal of the respective preceding period.

2. The method for managing institutional investment as set forth in claim 1, wherein
   the first period, the second period and the any subsequent periods are yearly periods.

3. The method for managing institutional investment as set forth in claim 1, further comprising:
   determining a dividend growth rate, wherein determining the fundamental rate of return is calculated using (1+the fundamental rate of return/100)=(1+average initial dividend yield/100)×(1+dividend growth rate/100) wherein, the average initial dividend yield, the dividend growth rate, and the fundamental rate of return are cardinal numbers.

4. A computer-implemented method for managing institutional investment portfolios on an at least partial dividend withdrawal basis during a mandate term, the method comprising:
   (a) determining, by a computer, an income withdrawal percentage for at least one period during the mandate term;
   (b) determining, by the computer, an average initial dividend yield;
   (c) determining, by the computer, a fundamental rate of return;
   (d) allocating, by the computer, an initial amount of institutional capital to be invested during the mandate term in equity-based investments;
   (e) determining, by the computer, a first dividend goal for a first period of the mandate term, the first dividend goal determined by multiplying the initial amount of capital by the average initial dividend yield;
   (f) determining, by the computer, a first withdrawal amount from the first dividend goal, the first withdrawal amount associated with the first period;
   (g) determining, by the computer, an amount of capital for a second period of the mandate term by increasing the initial amount of capital during the first period by a predefined factor;
   (h) determining, by the computer, a second dividend goal for the second period of the mandate term, the second dividend goal determined by multiplying the amount of capital for the second period by the average initial dividend yield;

(i) determining, by the computer, a second withdrawal amount from the second dividend goal, the second withdrawal amount associated with the second period; and (j) repeating (g), (h) and (i), by the computer, for subsequent periods of the mandate term based on the amount of capital and the dividend goal of the respective preceding period.

5. The method as set forth in claim 4, wherein determining the first withdrawal amount includes multiplying the first dividend goal by the income withdrawal rate divided by the average initial dividend yield;

determining the second withdrawal amount includes multiplying the second dividend goal by the income withdrawal rate divided by the average initial dividend yield; and repeating determining the first withdrawal amount and determining the second withdrawal amount for subsequent periods of the mandate term.

6. The method as set forth in claim 4, wherein the predefined factor is determined by multiplying factor A by factor B, wherein factor A equals (1+((initial dividend yield−income withdrawal rate)/100)) and factor B equals (1+(dividend growth rate/100)).

7. The method as set forth in claim 4, wherein the income withdrawal factor varies for at least two periods of the mandate term.

8. The method for managing institutional investment portfolios as set forth in claim 4, wherein the first period, and the second period, and subsequent periods are yearly periods.

* * * * *